United States Patent
Brieskorn et al.

(10) Patent No.: US 8,520,819 B2
(45) Date of Patent: Aug. 27, 2013

(54) METHOD AND ARRANGEMENT FOR THE IMAGING REPRESENTATION OF INFORMATION, PARTICULARLY FOR USE WITH COMMUNICATION TERMINALS

(75) Inventors: Jürgen Brieskorn, Geltendorf (DE); Edmund Ernst, München (DE); Karl Klug, Miesbach (DE); Stephan Schaade, Buchloe (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 56 days.

(21) Appl. No.: 13/063,988

(22) PCT Filed: Sep. 18, 2009

(86) PCT No.: PCT/EP2009/006769
§ 371 (c)(1),
(2), (4) Date: Mar. 15, 2011

(87) PCT Pub. No.: WO2010/034437
PCT Pub. Date: Apr. 1, 2010

(65) Prior Publication Data
US 2012/0002802 A1      Jan. 5, 2012

(30) Foreign Application Priority Data
Sep. 23, 2008   (DE) .................. 10 2008 048 447

(51) Int. Cl.
*H04M 3/42*         (2006.01)
(52) U.S. Cl.
USPC ................... 379/201.04; 345/3.3

(58) Field of Classification Search
USPC ................... 379/201.04; 345/3.3
See application file for complete search history.

(56) References Cited

U.S. PATENT DOCUMENTS

| | | |
|---|---|---|
| 2002/0021391 A1 | 2/2002 | Yoshino |
| 2005/0219198 A1 | 10/2005 | Pasqualini et al. |
| 2007/0046618 A1* | 3/2007 | Imai .................. 345/102 |

(Continued)

FOREIGN PATENT DOCUMENTS

| | | |
|---|---|---|
| CN | 1549085 A | 11/2004 |
| EP | 1274062 A2 | 1/2003 |
| EP | 1653435 A1 | 5/2006 |
| EP | 1672411 A2 | 6/2006 |

OTHER PUBLICATIONS

International Preliminary Report on Patentability for PCT/EP2009/006769 dated Mar. 29, 2011 (Form PCT/IB/373, PCT/ISA/237) (German Translation).

(Continued)

*Primary Examiner* — Alexander Jamal
(74) *Attorney, Agent, or Firm* — Buchanan Ingersoll & Rooney PC

(57) ABSTRACT

The invention relates to a method and to an arrangement for the imaging representation of information, particularly for use with communication terminals. The arrangement comprises an image output device having at least one first partial region and at least one second partial region, wherein the first partial region is designed such that the representation of the information is optimized for high-quality imaging and the second partial region is designed such that it is optimized for lower-quality imaging. According to the method, the first partial region is activated when data is present for output using high-quality imaging, while the second partial region is always actively operated.

13 Claims, 1 Drawing Sheet

(56) References Cited

U.S. PATENT DOCUMENTS

| | | |
|---|---|---|
| 2008/0129677 A1 | 6/2008 | Li et al. |
| 2008/0172569 A1 | 7/2008 | Lee |
| 2009/0316795 A1* | 12/2009 | Chui et al. ............... 375/240.25 |
| 2009/0322915 A1* | 12/2009 | Cutler ........................... 348/251 |

OTHER PUBLICATIONS

International Preliminary Report on Patentability for PCT/EP2009/006769 dated Dec. 16, 2011 (Form PCT/IB/373, PCT/ISA/237) (English Translation).

Written Opinion of the International Searching Authority for PCT/EP2009/006769 dated Feb. 15, 2010 (PCT/ISA/237) (English Translation).

International Search Report for PCT/EP2009/006769 dated Feb. 15, 2010 (Form PCT/ISA/210) (German Translation).

International Search Report for PCT/EP2009/006769 dated Feb. 15, 2010 (Form PCT/ISA/210) (English Translation).

Written Opinion of the International Searching Authority for PCT/EP2009/006769 dated Feb. 15, 2010 (Form PCT/ISA/237) (German Translation).

* cited by examiner

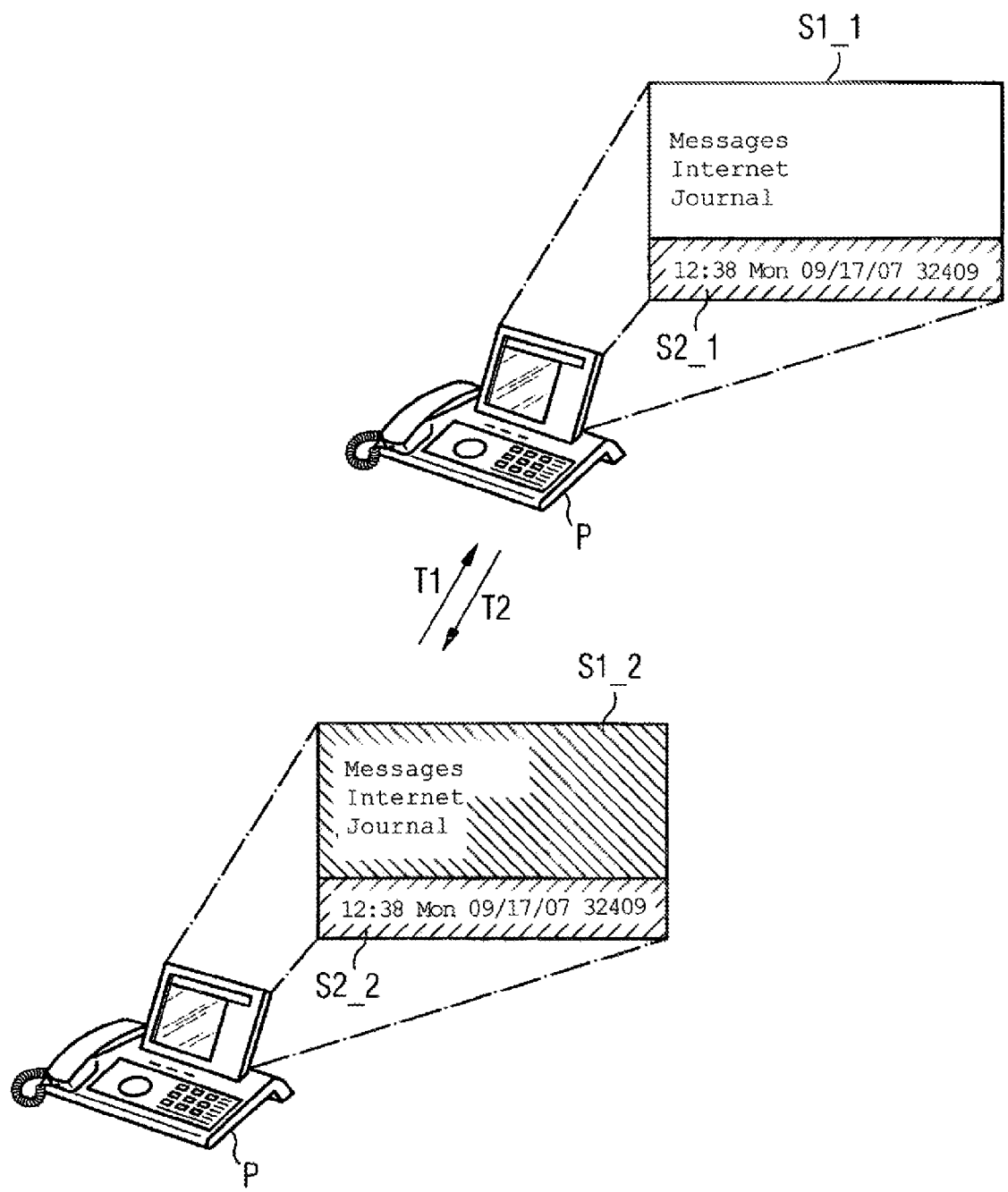

METHOD AND ARRANGEMENT FOR THE IMAGING REPRESENTATION OF INFORMATION, PARTICULARLY FOR USE WITH COMMUNICATION TERMINALS

CROSS-REFERENCE TO RELATED APPLICATIONS

This application is the United States national phase under 35 U.S.C. §371 of PCT International Patent Application No. PCT/EP2009/006769, filed on Sep. 18, 2009 and claiming priority to German Patent Application No. 10 2008 048 447.4, filed on Sep. 23, 2008.

BACKGROUND OF THE INVENTION

1. Field of the Invention

Embodiments relate to a system for the imaging representation of information, particularly for use with communication terminals as well as a method for the imaging representation of information, particularly for use with communication terminals.

2. Background of the Related Art

It is known that communication devices include screens for representing information. Operating these screens increases the energy consumption of the communication device.

Energy production and use are increasingly being addressed, however, not only due to the cost, but recently also in the context of discussions about global warming and generally about the efficient use of resources.

This in the meantime has also led to legal regulations, but also to a change in purchasing behavior which further requires optimization of energy requirements.

For this reason, the issue of energy savings has become increasingly important with regard to communication systems as well, in particular for devices in this field with power cords.

BRIEF SUMMARY OF THE INVENTION

Embodiments of the invention provide an arrangement and a method to improve the energy requirements of electronic devices, in particular devices related to communication technology.

In a preferred embodiment for imaging representation of information, in particular for use with communication terminals, the arrangement comprises an image output device having at least one first partial region and at least one second partial region, wherein the first partial region is designed such that the representation of the information is optimized for high-quality imaging and the second partial region is designed such that it is optimized for lower-quality imaging.

Embodiments are based on the knowledge that many devices, especially in an office environment, sometimes use energy unnecessarily, when the user is not present.

It was also recognized that, in particular for telephones, the constant development of new functions was increasing the requirements for information representation, necessitating higher-resolution displays for various applications. Such displays are driving power consumption even higher. The invented arrangement reduces this effect, because it allows the imaging device, in particular a display, to be divided into regions with two different representation concepts.

This makes it possible to save energy by selectively optimizing screen usage depending on the current use. For example, data that are often or even permanently displayed, such as date and time or the direct dial number assigned to the terminal, can be shown in the region that offers lower resolution.

In an advantageous further embodiment of the invention, the first partial region is designed such that optimization for high-quality imaging is produced through a first type of backlighting, and the second partial region is designed such that optimization for lower-quality imaging is achieved through a second type of backlighting. This involves discerning between content that can be presented almost or even entirely without backlighting, simply using the contrast of the display output against the background, such as display outputs of alphanumeric characters and symbols on monochromatic LCDs, and content whose details would be more difficult to recognize without backlighting, such as graphics, pictures, and combinations of these with alphanumeric characters.

According to an additional embodiment of the invention, the first partial region is designed such that the brightness of the backlighting can be reduced automatically. This can involve a control function that adjusts the lighting without input from a user and reduces the brightness after the display has not changed for a preset length of time, for example.

Preferably, an embodiment can further include having the first partial region designed such that it can be switched on and off according to a power-saving regimen. This would involve flexible and adaptive power-saving processes with preset or adjustable scenarios that could be optimized for the type of use and/or environment.

In another preferred embodiment, the first partial region is designed such that the power-saving regimen involves at least partial shutdown of at least part of the first partial region. This guarantees maximum power savings. These measures can be incorporated, for example, by a power regimen when the usage log for functions that require a higher-quality image output shows that they have not been used for a long period of time or that the displayed content has not changed for a long period of time.

In an alternative or expanded further embodiment, the first partial region is designed such that optimization to high-quality imaging is produced through a first type of high-resolution display for image content, and the second partial region is designed such that optimization to lower-quality imaging is achieved through a second type of low-resolution display. This allows a greater amount of freedom in setting the power requirement, with simultaneous consideration of the required display quality.

With an embodiment of the invented method for imaging representation of information, in particular for use with communication terminals, in an image output device having at least one first partial region and at least one second partial region, the first partial region is activated when data suited to output with high-quality imaging are present, while the second partial region is always actively operated.

An embodiment allows energy savings while simultaneously guaranteeing the availability of a minimum information display, of often used or current information, for example, that is displayed by communication terminals.

If the first partial region is at least partially deactivated after outputting the relevant data, the high-quality display can be switched on or off as needed.

Additional advantages and details about embodiments of the invention are explained using the exemplary embodiments of the invention shown in the following figure. Shown in the figure is a diagram of an example of the invention in two situations according to the invention.

BRIEF DESCRIPTION OF THE FIGURE

The figure shows a diagram of an example of the invented method and the invented arrangement.

DETAILED DESCRIPTION OF THE INVENTION

The FIGURE shows a telephone P with a display. This display is divided into a first segment S1_1, S1_2 and a second segment S2_1, S2_2.

According to an embodiment of the invention, the first segment S1_1, S1_2 is suitable for outputting information that requires a higher level of quality for its display.

For this example, the figure shows a menu, from which other menus could be made to appear by selecting one of the items, for example, so that the sequence would branch more and more finely and therefore generate higher display quality requirements. According to embodiments of the invention, this type of data would be appropriate for outputting in the first segment S1_1, S1_2.

Here, at a first point in time Ti at which the menu is called up, the first segment is brought from an unlit status (S1_1) to a status in which the display lighting is switched on (S1_2).

The figure also shows the fact that both before and after the first point in time T1, the second segment S2_1, S2_2 is outputting information with unchanged quality. According to the example, this information consists of the time, date, and telephone number of the telephone P. This information can be displayed with lower resolution and does not require any backlighting. Here it is assumed that the arrangement according to the second segment S2_1, S2_2 according to the example consists of a monochromatic LCD screen.

If the menu is not used for a longer period of time, the first segment S1_1, S1_2 goes back to its original status at a second point in time T2. This means that the backlighting is switched off for the first segment S1_1, S1_2.

It is also conceivable that the user could actively induce that status. As an alternative or addition, the display can also be controlled such that various energy-saving regimens are preset, so that a wide variety of circumstances can be preset to trigger the backlighting being switched on or off.

In addition, the energy-saving regimen can include gradual reduction of the display lighting. This allows the user to react before the screen lighting is completely switched off. A timer can also be set for this, so that power is reduced during operation pauses but a minimum operating comfort level is still guaranteed, wherein the user does not have to wait for the backlighting to switch on and does not have to do anything other than make the next menu selection in order to activate it.

The invention-related advantage is based on the assumption that in many cases when the telephone is in standby status, it is sufficient for it to display only a few items of important information.

A fundamental element of the invention is therefore the segmentation of the display for this purpose. According to the invention, the arrangement example involves a division into the first segment S1_1, S1_2 using standard commercially available backlighting, to which energy-saving technology such as switching off or dimming can be added, and the second segment S2_1, S2_2 using alternative backlighting based on LED technology or monochromatic LCD with lower power consumption. The latter segment then shows the display content, as explained, which must always be present based on the user's wishes or factory settings, such as date, time, caller and/or that phone's number, etc.

The segments can be arranged in a device either together or separated by space. For example, the lower-quality display can be integrated into the speaker while the display with higher-quality output is in the device. As an alternative, they can also both be in one unit with sufficient space.

In addition to branching menus, if brighter graphic content is needed or required, the portion of the display in energy-saving mode is also reactivated, so that according to the invention the otherwise customary high power consumption is limited just to this use time, which drastically reduces energy requirements.

The invention claimed is:

1. A method for imaging representation of information comprising:
    a display of a telephone displaying a menu in a first region of the display at a first level of quality;
    the display of the telephone displaying indicia in a second region of the display at a second level of quality that is lower than the first level of quality and wherein no backlighting is provided for the second region; and
    the telephone deactivating backlighting or reducing backlighting to a lower brightness upon a determination that the menu displayed via the first region is unused for a predetermined period of time; and
    wherein the indicia of the second region is comprised of indicia for time, date and telephone number.

2. A system for imaging representation of information, for use with a telephone, the system comprising:
    a display having at least one first region and at least one second region, the first region displaying a menu at a first level of quality and the second region displaying indicia at a second level of quality, the first level of quality being higher than the second level of quality;
    the display providing no backlighting for the second region; and
    backlighting for the first region being deactivated or reduced to a lower brightness upon a determination that the menu displayed via the first region is unused for a predetermined period of time; and
    wherein the indicia of the second region is comprised of indicia for time, date and telephone number.

3. The system of claim 2, wherein the backlighting for the first region is deactivated and the deactivation of the backlighting for the first region occurs automatically.

4. The system of claim 2, wherein the backlighting for the first region is reduced.

5. The system of claim 2, wherein the menu displayed by the first region is comprised of multiple branches.

6. The system of claim 2, wherein the first level is a level of resolution and the second level is a level of resolution.

7. The system of claim 2, wherein the first region comprises a first type of high-resolution image content display, and the second region comprises a second type of lower-resolution display.

8. The method of claim 1, wherein the deactivation of backlighting occurs after a user enters input to view the menu via the first region.

9. The method of claim 1, wherein the backlighting for the first region is deactivated and the deactivation of the backlighting for the first region occurs automatically.

10. The method of claim 1, wherein the backlighting for the first region is reduced.

11. The method of claim 1, wherein the menu displayed by the first region is comprised of multiple branches.

12. The method of claim 1, wherein the first level is a level of resolution and the second level is a level of resolution.

13. The method of claim 1, wherein the first region comprises a first type of high-resolution image content display, and the second-region comprises a second type of lower-resolution display.

* * * * *